United States Patent [19]

Holtvoigt

[11] 4,141,156
[45] Feb. 27, 1979

[54] GLOBE LAMP WITH CIRCUMNAVIGATING AIRCRAFT

[75] Inventor: John H. Holtvoigt, Tipp City, Ohio
[73] Assignee: The Dolly Toy Company, Tipp City, Ohio
[21] Appl. No.: 830,434
[22] Filed: Sep. 6, 1977
[51] Int. Cl.² ............................................. G09B 27/08
[52] U.S. Cl. ................................. 35/46 A; 40/431; 46/1 H; 362/809
[58] Field of Search ............... 35/46 R, 46 A, 47, 45; 40/427, 429, 430, 431; 46/1 H; 362/809; 272/31 A, 1 C

[56] References Cited

U.S. PATENT DOCUMENTS

| | | | |
|---|---|---|---|
| D. 109,811 | 5/1938 | Jones, Jr. .............................. D10/5 |
| 649,079 | 5/1900 | Sewell ................... 35/46 R |
| 892,835 | 7/1908 | Hurst ......................... 35/45 |
| 1,419,598 | 6/1922 | Zelazo .............. 35/46 R X |
| 1,515,135 | 11/1924 | Alexander ........................ 35/46 R |
| 1,629,582 | 5/1927 | McClintock ...................... 35/46 A |
| 1,659,810 | 2/1928 | Damoff ............................ 35/46 R |
| 1,957,763 | 5/1934 | Dupler ................................ 40/431 |
| 2,171,509 | 8/1939 | Peterson ......................... 35/46 R |
| 2,343,173 | 2/1944 | Dupler ............................ 35/46 R |
| 2,345,800 | 4/1944 | Dupler ........................ 35/46 R X |
| 2,434,250 | 1/1948 | Rebus ........................ 35/46 R X |
| 2,492,691 | 12/1949 | Dietz ............................. 35/46 R |
| 2,643,882 | 6/1953 | Dozier ............................. 272/31 A |
| 2,809,448 | 10/1957 | Oestergaard et al. ............. 35/46 R |
| 2,811,356 | 10/1957 | Reed ......................... 35/46 R X |
| 2,916,850 | 12/1959 | Vlachos .......................... 35/47 X |

Primary Examiner—Wailliam H. Grieb
Attorney, Agent, or Firm—Biebel, French & Nauman

[57] ABSTRACT

A globe lamp with a simulated aircraft circumnavigating the globe in a stable equatorial orbit carrying flashing and non-flashing lights.

17 Claims, 11 Drawing Figures

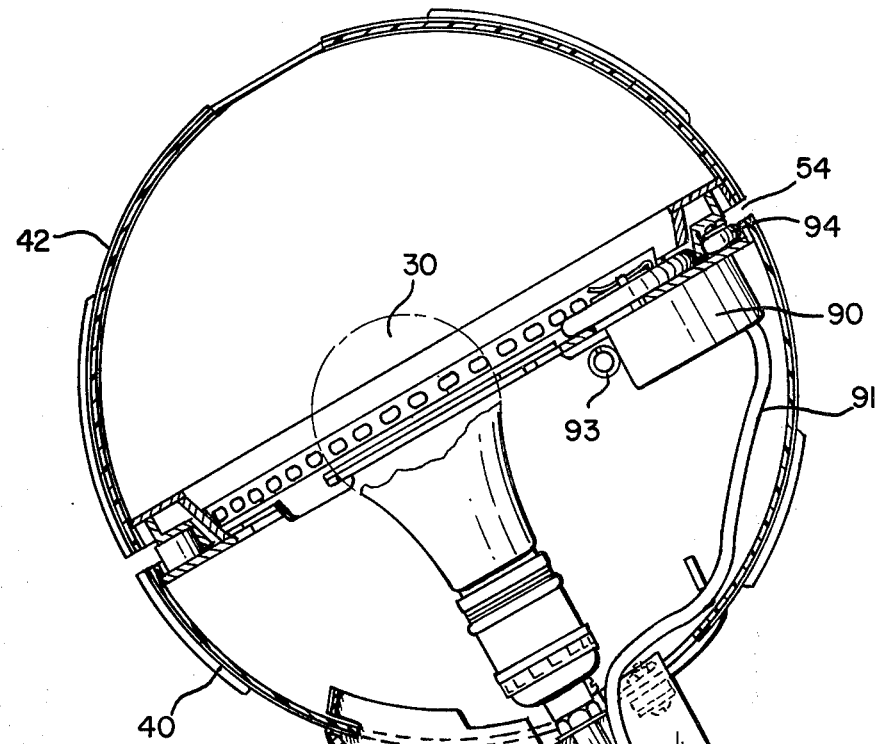
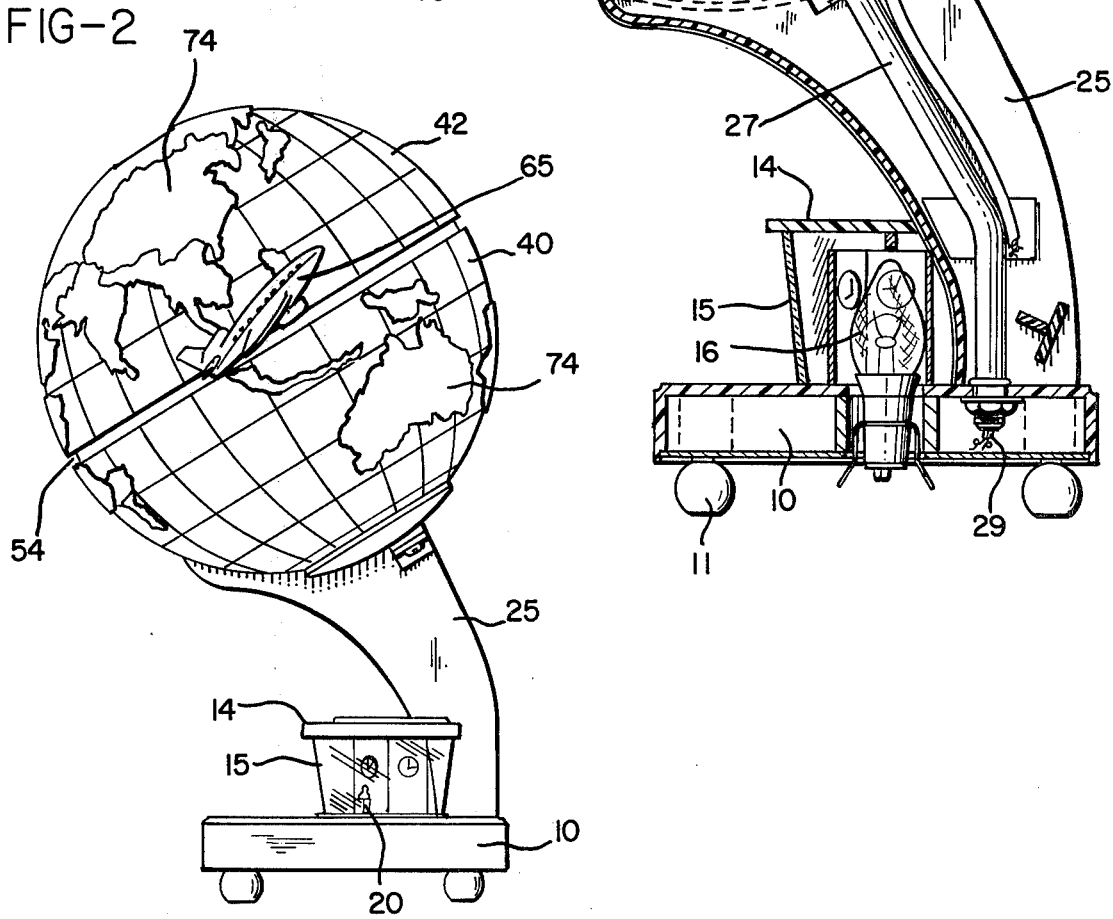

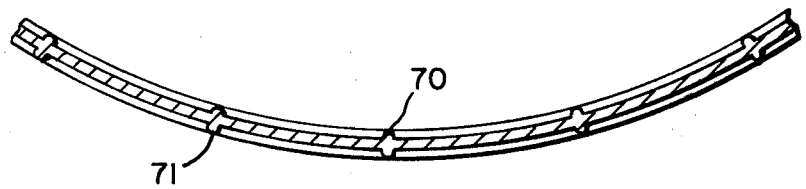
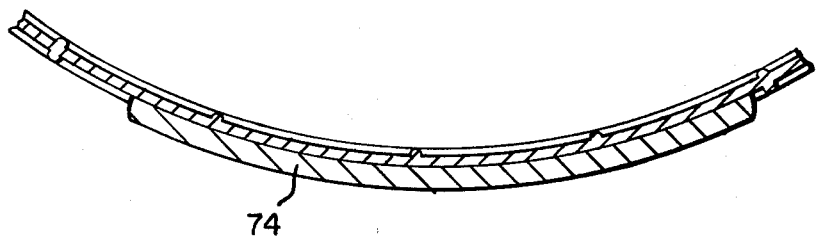
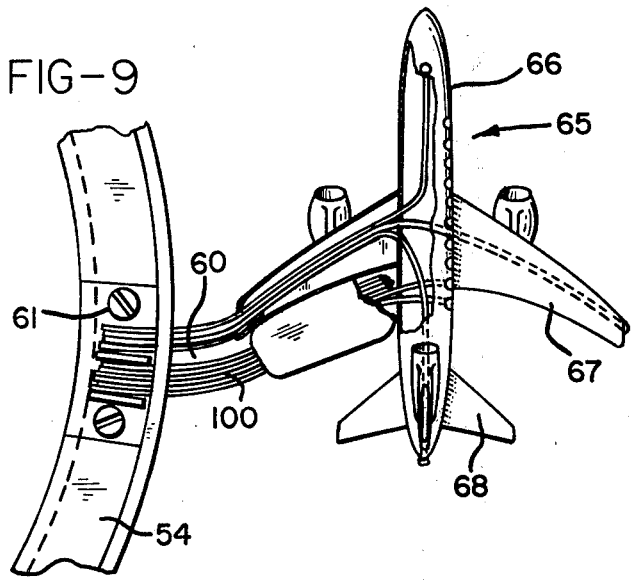
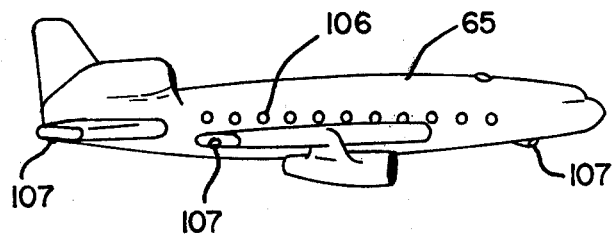
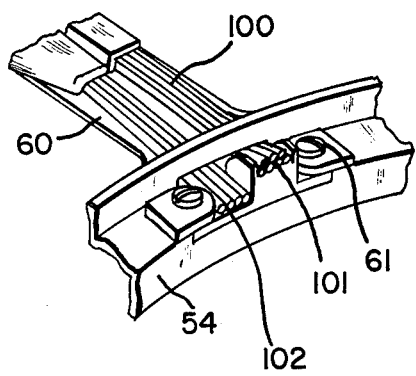

4,141,156

GLOBE LAMP WITH CIRCUMNAVIGATING AIRCRAFT

CROSS-REFERENCE TO RELATED APPLICATIONS

Cross-reference is made to copending design application Ser. No. 830,486, filed on an even date herewith.

BACKGROUND OF THE INVENTION

This invention relates to a decorative display device in the form of a globe with a circumnavigating simulated aircraft, and more particularly relates to such a display device which may be fitted with at least a main light source within the globe so that it also serves as a lamp.

Gloves having circumnavigating simulated aircraft have long been known. See, for example, U.S. Pat. Nos. 1,659,810; 2,434,250; 2,643,882; 2,811,356 and 2,916,850. All have simulated aircraft of one form or another carried by an arm extending from a central hub on the axis of the globe. This causes problems in that such an arrangement fails to support the aircraft in a stable and uniform manner resulting in an undesirable vibration or wobble as the aircraft rotates. When the arm extends through a narrow equatorial gap in the globe as in U.S. Pat. Nos. 1,659,810 and 2,434,250, wobble of the arm can lead to stalling during rotation because of the rubbing of the arm against the edge of either the upper or lower hemisphere.

In addition, none of the above-mentioned patents disclose display devices which can also be used as a lamp. Of course, illuminated globes are well-known. See, for example, U.S. Pat. Nos. 1,419,598, 1,515,135, 2,171,509, 2,343,173, 2,345,800, 2,492,691 and 2,809,448. Globe-shaped lamp shades have also been proposed as in U.S. Pat. No. 649,079. However, to my knowledge, no one has as of yet produced a globe lamp which has a circumnavigating simulated aircraft. In fact, the only lamp of any kind which I know of having a circumnavigating simulated aircraft is shown in U.S. Pat. No. Des. 109,811, but that is not a globe lamp.

Perhaps, the failure of others to produce such a globe lamp comes from the difficulties encountered in providing a circumnavigating simulated aircraft with a stable equatorial orbit and in accommodating a central light source within a globe having a circumnavigating simulated aircraft. Those difficulties have been overcome with the present invention.

SUMMARY OF THE INVENTION

The present invention provides for supporting the aircraft in a firm and stable manner free of vibration throughout its orbiting travel. A single center light source illuminates the interior of the globe on which there are shapes of different light transmitting properties corresponding to the continents, and there is likewise a pattern of markings corresponding to the parallels of latitude and longitude. Through the use of fiber optic elements light is transmitted from the source to the aircraft and by means of a mask, one group of lights, such as the wing light, are caused to flash while another group, such as the cabin and cockpit lights, are on continuously. The lamp preferably includes a simulated control tower in its base which may also be illuminated.

BRIEF DESCRIPTION OF THE DRAWINGS

FIG. 1 is a side elevational view of the globe lamp according to this invention;

FIG. 2 is a view of the lamp in vertical section showing details of the construction;

FIG. 7 is a broken view through a portion of the globe showing the internal and external ribs for supporting the shapes simulating the continents;

FIG. 8 is a similar view showing the outer ribs fused into one of the continent shapes to support the latter in proper position;

FIG. 9 is a broken plan view looking down on the arm which supports the aircraft and showing the arrangement of the two groups of fiber optics;

FIG. 10 is a view looking toward the support arm and the fiber optics shown in FIG. 9 and illustrating their arrangement in two different levels to receive continuous light at one level and interrupted light at the other; and FIG. 11 is a side view of the aircraft showing the two groups of lights which it carries one being continuously on and the other flashing "On" and "Off".

DESCRIPTION OF THE PREFERRED EMBODIMENT

Figure 3:
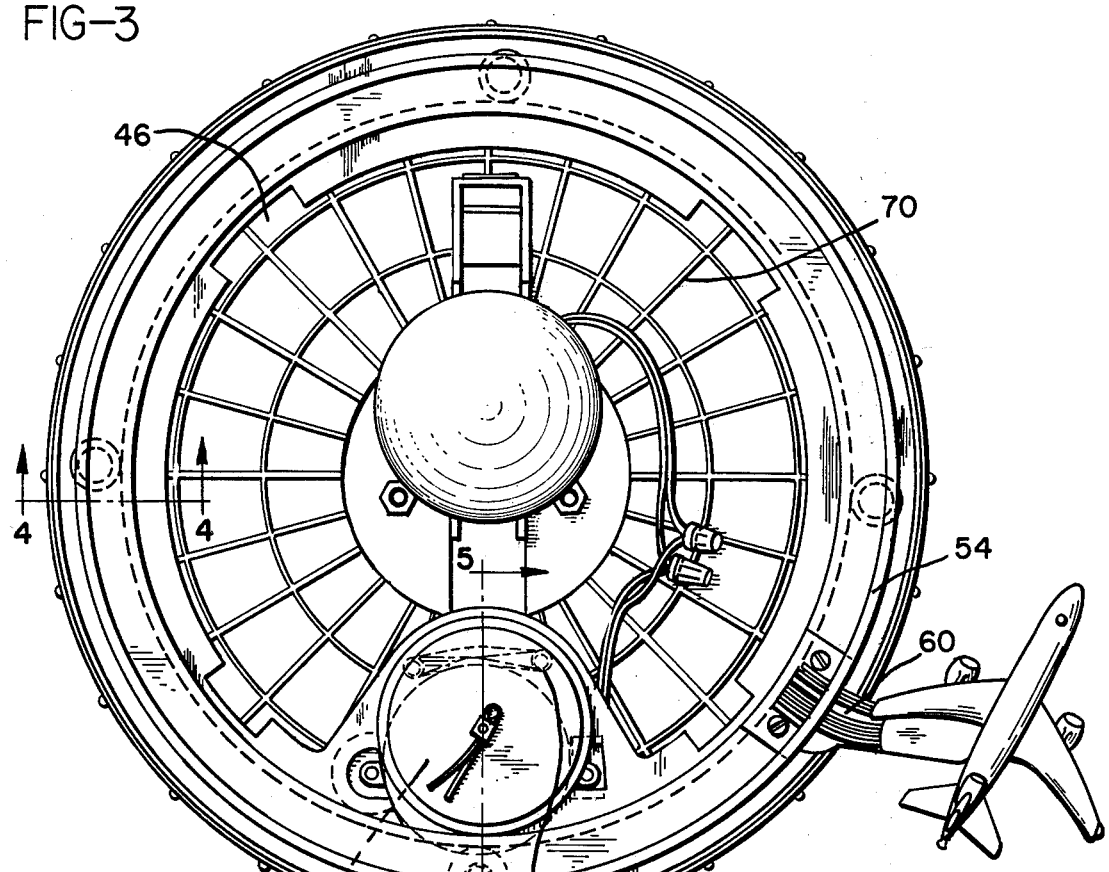
FIG. 3 is a view with the upper hemisphere removed looking down on the lower hemisphere along its axis.
Figure 4:
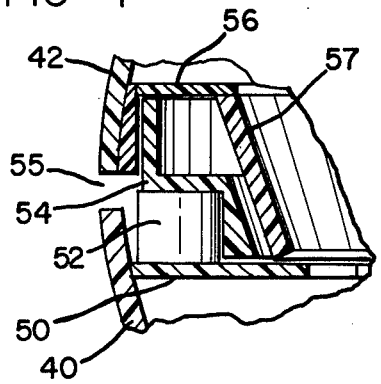
FIG. 4 is a detail sectional view on the line 4—4 of FIG. 3.
Figure 5:
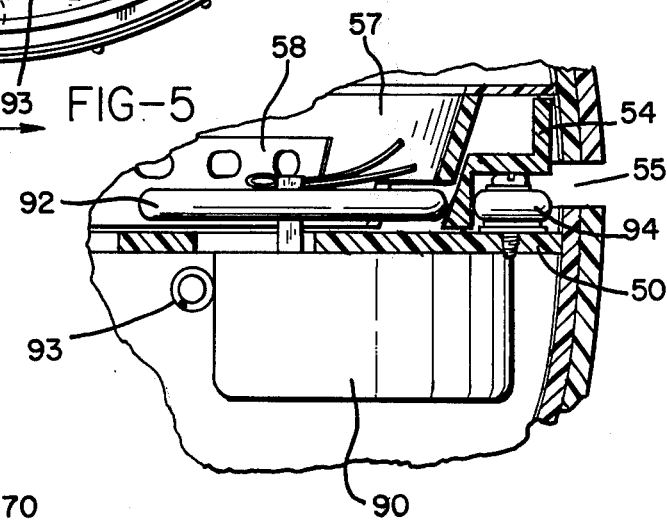
FIG. 5 is a detail view showing the drive means on line 5—5 of FIG. 3.

Referring now to the drawings which disclose a preferred embodiment of the invention, a hollow base 10 is supported on feet 11 and there is a simulated control tower 14 on the base which has transparent side walls 15 and an interior light bulb 16. A control switch 20 is mounted on the base and is preferably wired with multiple positions in one of which the main light source 30 in the globe is on, in another the main light source 30 and the bulb 16 are on, and in a third position the bulb 16 only is lighted so that in this condition the lamp serves as a night light.

A hollow pedestal 25 is mounted on base 10 and is inclined at an angle of $22\frac{1}{2}°$ to the vertical corresponding to the inclination of the earth's axis. A tube 27 leading to a socket 28 provides for housing a lamp cord 29 to supply electricity to the main light source 30 in the form of a single internal lamp mounted approximately centrally of the globe.

Referring now to the globe itself there is a lower housing (hemisphere 40) mounted on the pedestal and an upper housing (hemisphere 42) detachably supported on the lower housing through the use of bayonet type connections 45, 46. Thus to secure access to the lamp for replacement and the like the upper hemisphere 42 is twisted relative to the lower one and can be directly removed therefrom.

The lower hemisphere 40 has an internal rib 50 which carries a series of plastic buttons 52 which form a track for a rotatable ring 54 in essentially a Z-shape so that it will be guided for rotation on the series of buttons. The mounting of the upper hemisphere 42 on the lower hemisphere 40 is such as to leave a gap 55 therebetween which extends around the entire circumference of the globe. It will also be apparent that ring 54 overlaps the gap 55 and thus shields the direct rays of light from lamp 30 so that it does not appear as a ring of light. Nevertheless the gap remains open to allow for ventilation of the heated air from the lamp.

Upper hemisphere has fixed to it an inverted U-shaped flange 56 of translucent material which depends to overlie the series of buttons 52 with a sloping inner face 57. The lower part of face 57 carries a circumferential opaque mask 58 to produce the effect of flashing lights, as will be described later.

Ring 54 carries an outwardly extending arm 60 which is fastened thereto by screws 61 and adapted to extend out through the gap 55. The arm 60 forms a support for a simulated aircraft 65 having a fuselage 66, wings 67 and a tail portion 68.

A series of ribs 70 are formed on the interior of both upper and lower hemispheres and a corresponding series of rib 71 is formed on the outer circumference thereof. As shown a number of shapes 74 depicting the continents of the earth are arranged to be mounted on the outer ribs 71 and may be fused thereto by supersonic welding to thereby anchor the continents in place in the manner shown in FIG. 8. It will be understood that the ribs are arranged in a pattern corresponding to the parallels of latitude and longitude so that when illuminated from the interior of the globe they create a pattern of different light intensity and hence are visible in all areas of the globe outside those covered by the continental shapes.

In order to drive the arm 60 and to rotate the ring 54 in the equatorial plane a motor 90 supplied from a branch 91 of lamp cord 29 is mounted in the lower hemisphere and is provided with a friction wheel 92 which is rotatable by the motor on a tilt axis so that as it engages the lower flange of ring 54 it will tend to drive the ring downwardly and thus retain it in constant position against the buttons 52, thus allowing the ring to rotate smoothly and without vibration. A spring 93 urges the motor radially outward against flange 54 which is backed up by a roller 94 fixed on lower hemisphere rib 50 to maintain uniform smooth driving contact. The fact that a friction drive is provided means that even if the arm is held against movement, the drive will merely slip without causing any damage.

Figure 6:
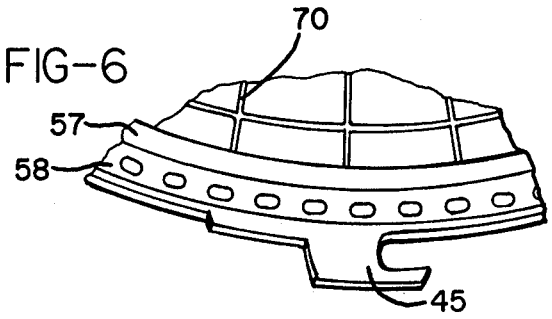
FIG. 6 is a broken view from the inside of the globe showing the rotating ring with the transparent and masked areas to provide continuous and flashing light application.

In order to provide for transmitting light from main light source 30 to the interior of the plane, two sets of fiber optic elements 100 are mounted on arm 60 and arranged in an upper level 101 and a lower level 102 as shown in FIG. 10. Thus as arm 60 rotates, group 101 at the upper level opposite the clear portion of flange 57 (FIG. 6) will transmit light continuously while group 102 opposite mask 58 will transmit light intermittently and thus produce the effect of flashing lights.

Referring to FIG. 11, the continuous lights are illustrated at 106 opposite the port holes in the fuselage of the plane while the flashing lights 107 located in the nose, on the wings and in the tail of the plane are those which will flash as the aircraft revolves around the globe.

It will thus be clear that the invention provides a decorative display device in the form of a globe with the simulated continents and with a pattern of parallels of latitude and longitude which appear in contrast over the entire surface of the globe. When the main light source 30 is energized and the motor drives the ring, the arm, and the aircraft, the light will be picked up and transmitted through one group of fiber optics to cause continuous lighting of the interior of the aircraft and to cause the other group of aircraft lights to flash, thus simulating the condition of a normal aircraft in flight. The rotating motion of the aircraft is smooth and uniform and may be timed appropriately to circumnavigate the globe in a suitable period, for example, of about one-half minute. The overall effect is pleasing and interesting as well as being scientifically accurate. When desired the interior globe light may be turned off and only the control tower light illuminated to then serve as a night light.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A decorative display device in the form of a globe comprising a base, a first hemisphere mounting on said base, a second hemisphere detachably mounted on said first hemisphere leaving an equatorial gap therebetween, a ring rotatably mounted on the inner circumference of said first hemisphere, an arm carried by said ring and extending radially outward through said gap, and a simulated aircraft carried by said arm and rotatable on a polar axis in an equatorial orbit around said device.

2. A decorative display device as defined in claim 1 including a drive motor in said device and drive means between said motor and said ring.

3. A decorative display device as defined in claim 2 in which said drive includes a friction drive wheel, and means for yieldably urging said drive wheel into contact with the surface of said ring.

4. A decorative display device as defined in claim 3 including means for mounting said wheel for rotation on an axis at an angle to said polar axis.

5. A decorative display device as defined in claim 1 including a light source in said device.

6. A decorative display device as defined in claim 5 including a group of fiber optic elements having their ends exposed to said light source and carried by said arm for creating lighted areas in said aircraft.

7. A decorative display device as defined in claim 6 including a mask carried by said ring having alternating translucent and opaque portions to produce flashing lights in said aircraft.

8. A decorative display device as defined in claim 7 including a plurality of groups of fiber optic elements in different planes with one group being in the plane of said mask and another group in a different plane to cause one group of lights in said plane to flash and another group to be continuous.

9. A decorative display device as defined in claim 5 including markings on the hemispheres of different light transmitting characteristics arranged in a pattern corresponding to the parallels of latitude and longitude to cause said parallels to be visually apparent on the surface of the device.

10. A decorative display device as defined in claim 9 in which said markings are in the form of raised ribs.

11. A decorative display device as defined in claim 1 including elements on said hemispheres simulating the continents of the globe.

12. A decorative display device as defined in claim 10 including raised ribs on both the interior and exterior of said hemispheres.

13. A decorative display device as defined in claim 11 in which the ribs provide attachment for the continent simulating shapes.

14. A decorative display device as defined in claim 1 in which said base is in the form of an aircraft control tower.

15. A decorative display device as defined in claim 5 in which there is a light in said control tower.

16. A decorative display device as defined in claim 15 including switch means for selectively controlling said light source to provide for said globe to be lighted or for only said control tower to be lighted for use as a night light.

17. A decorative display device as defined in claim 5 including means for shielding the direct rays of light from said light source from being visible through said gap.

* * * * *